United States Patent [19]
Unruh

[11] Patent Number: 5,622,337
[45] Date of Patent: Apr. 22, 1997

[54] METHOD AND REFERENCE POINT APPARATUS FOR TRAINING FREE FALL PARACHUTISTS

[76] Inventor: Peter J. Unruh, 4900 N. Taylor Rd., Eloy, Ariz. 85231

[21] Appl. No.: 488,604

[22] Filed: Jun. 8, 1995

[51] Int. Cl.$^6$ .................................................. B64D 23/00
[52] U.S. Cl. .......................................... 244/142; 244/147
[58] Field of Search .................................. 244/147, 142, 244/152; 116/209, 200; 434/30, 35

[56] References Cited

U.S. PATENT DOCUMENTS

| | | | |
|---|---|---|---|
| 2,593,427 | 4/1952 | Fill | 244/142 |
| 3,420,478 | 1/1969 | Ferguson | 244/142 |
| 3,515,362 | 6/1970 | Richardson et al. | 244/142 |
| 3,536,279 | 10/1970 | Goalwin | 244/142 |

*Primary Examiner*—Andres Kashnikow
*Assistant Examiner*—Tien Dinh

[57] ABSTRACT

A reference point device and method for aiding in the training of free falling parachutists or skydivers. The reference point device indicates relative position and velocity to the skydiver during free fall, and is structured to be first tossed from an airplane followed immediately by the skydiver jumping, or released from the hands of the skydiver shortly after jumping from an airplane, wherein the reference device achieves and maintains the approximate terminal velocity of the free falling skydiver. The reference device falls in a stable manner, enabling the skydiver to have a close proximity visual point of reference to determine or gauge his or her relative directional movement and speed of fall, and this so that the skydiver may practice movement and speed control during free falling prior to opening his or her parachute. The reference device preferably includes an attached stored parachute and a deployment system to deploy the parachute at the proper height above ground level so as to bring the reference point device to a soft landing.

3 Claims, 7 Drawing Sheets

METHOD AND REFERENCE POINT APPARATUS FOR TRAINING FREE FALL PARACHUTISTS

BACKGROUND OF THE INVENTION

1. Field of the Invention

This invention includes a reference point device (apparatus) and method or process of use thereof for training free fall parachutists (skydivers). The reference point device, which is intended to be dropped from an aircraft, is structured to free fall through the air toward the Earth independently at the same terminal velocity as a free falling skydiver. The reference device maintains a relative stable position when falling vertically, thus enabling the skydiver to have a visual point of reference in continuous close proximity to determine his lateral movement direction and speed of fall relative to the reference device, and this so that the skydiver may practice control of movement, rate of fall, and stability during free fall prior to opening of a parachute.

2. Description of the Related Prior Art

In the sport of parachute skydiving, the skydiver delays deploying the parachute for a short period, such as 40 to 80 seconds, in order to experience the freedom of the fall. Whether intended or not, the speed of the fall, and directional movement during the fall can be effected by the placement of the arms, legs and position of the body. Since even minor body and extremity movements can significantly effect direction, and speed to a lesser degree, it is quite easy to drift laterally off course, especially for novice skydivers. It is also difficult for the skydiver to determine whether he or she is off course since the only points of reference are landmarks on the ground below, which at high altitudes can be extremely difficult to see and use effectively, or another skydiver who may himself be traveling laterally (off course). Mastering control is difficult since the skydiver has little in the way of reference to compare his or her movement or position, and thereby ascertain deviation from the desired direction and speed. Devices such as portable altimeters utilizing sensed barometric pressure, some with battery powered microprocessors to calculate and display rate of fall, are available for indicating elevation, and therefore the point at which the skydiver should deploy the parachute. Barometers and like devices do not however indicate lateral movement of the person during free fall.

Other known prior art are the numerous automatic parachute deployment systems currently available in the marketplace and in wide use particularly in the field of skydiving equipment for automatically opening parachutes at the proper and safe height above ground level (AGL). Modern automatic parachute deploying controls are relatively complex, often employing barometric pressure sensors connected to function in cooperation with microprocessors having solid-state memory capabilities serving as miniature computers to calculate and determine the proper height above ground level (AGL) to trigger via electro-mechanical devices the deployment of the skydiver's primary or secondary parachute.

Additionally, although there have been a number of free falling objects designed to be dropped from airplanes and like flying machines, such as bombs or weather stations some with deployable parachutes; none have been structured to fall at the same terminal velocity as a free falling human to be used as a reference point and teaching aid for skydivers in learning control during free fall.

There is a significant need in the field of skydiving to provide an improved method and apparatus for skydivers to determine and practice lateral movement and speed control during free fall.

SUMMARY OF THE INVENTION

The following summary and detailed description is of best modes for carrying out the invention, and there are clearly changes which could be made to that which is specifically herein described and shown in the included drawings without departing from the true invention. For example, sizes and weights, and materials in many cases which are herein given are for example so that those skilled in the art need not resort to undue experimentation in order to carry out the invention. The sizes, weights and materials given can in many cases be altered without departing from the true invention, but for the sake of briefness of this disclosure, all variations within the scope of the present invention will not be detailed.

The present invention provides a visually observable reference point device for aiding in determining relative velocity and direction of fall of a skydiver. The reference point device is structured to be tossed from a high altitude airplane or other suitable aircraft at about the same time or immediately prior to the skydiver jumping, or alternatively, the skydiver jumps with the reference device in hand and releases the device at the start of the free fall. The reference device is structured to achieve and maintain approximately the same terminal velocity as the skydiver, and it will achieve and maintain a stable vertical fall through the air within the same relative air mass the skydiver is also effected by, therefore the skydiver has a visual reference point which remains in continuous close proximity from which to visually gauge his or her falling position.

The reference point device, which may be used in a skydiver training method or process, includes a small housing with a lower portion of the housing containing a weight and/or electrical and mechanical components. An upper preferably cone-shaped portion of the housing preferably contains a stored parachute. The weight in the bottom of the housing in-part determines the velocity of the free fall of the reference device. The structure of the housing is also aerodynamically designed in conjunction with the overall weight (mass) to fall at the same terminal velocity as the skydiver, which is approximately 109 to 120 miles per hour (mph). The aerodynamic structure of the reference point device, the placement of the weight at the bottom end for a low center of gravity of the housing, and the careful placement of all objects having weight within the housing for balance, is to maintain the device in a relative vertical stable position during free fall. To avoid excessive spinning of the reference device, which may adversely affect velocity and direction of fall by creating lift, narrow longitudinal fins may be incorporated into the outside surface of the housing. Once the reference point device reaches its terminal velocity, it remains stable in speed, and this allows the skydiver to make attempts at improving his stability in the fall, or at increasing and decreasing his rate of fall or practice controlled lateral travel via body and extremity manipulations, wherein he utilizes the reference point device as a visual point of relative stability to gauge his success in achieving his desired position, stability or movement by looking at the reference point device.

Once released and allowed to free fall, the reference point device will achieve and maintain a relative stable vertical fall equal to that of the skydiver, and it can be observed and used as a reference point from which the free falling person may practice manipulating his or her fall speed and lateral position (movement), and or stability. The terminal velocity of a free falling human is normally achieved in about 11 seconds on average after leaving the plane, some a little faster such as in 8 seconds and others a little slower such as in 14 second, with body fat or lack thereof, clothing, and body shape of the skydiver all playing a role in the rate at which terminal velocity is achieved. The present reference point device is structured to achieve the same terminal velocity in approximately the same amount of time, between 8 and 14 seconds, so as to remain in close proximity to the skydiver. The reference point device may be weighted or shaped during manufacturing or after initial manufacturing to fall at different rates for skydivers who find that they fall faster or slower than other skydivers.

During the falling process, once near ground level as determined by electronics including a barometric pressure sensor in one embodiment of the invention, or a simple electric or spring-wound timer in another embodiment, or some other suitable means such as radio remote control or radar triggered systems, the reference device deploys the stored parachute, which gently lowers the device to the ground so it will not be damaged, and thus it can be reused. The parachute avoids damage to the device and injury to people and objects on the ground.

Preferably, there are control switches or buttons located on the exterior of the housing which can be set for automatic deployment of the parachute at a predetermined altitude above ground level henceforth "AGL" or after a specific amount of time has lapsed which can be adjusted by the person prior to release of the reference device. When a certain altitude AGL is reached or the pre-set time has lapsed, in a preferred structure of the reference device a vertically positioned release rod is drawn downward further into the parachute housing which releases engagement with a closing band. Release of the closing band detaches a ribbon housing which in turn releases a series of ribbons or streamers, which are primarily used to warn the skydiver to move away from the decelerating reference device to avoid collision and possible injury. The ribbons also help pull a flat annular parachute cover plate or cap from engagement over the top opening of the parachute housing, thus releasing the parachute. The elongated colorful ribbons preferably remain attached at one end thereof to the reference device.

In the reuseable reference device, once the skydiver lands, he can retrieve the reference device and repack the parachute for reuse. Additionally, although prohibited in many areas by laws for safety and littering reasons, the present reference point device may be structured without any slowing means or controls such as a parachute and parachute release system. In this situation, the reference device would most likely be a one time use item since it would probably be damaged upon impact with the ground, but this version of the reference point device could be manufactured very inexpensively such as from a properly shaped and weighted piece of rigid plastic foam for example.

Another feature of the free fall reference device is that it can be, and is preferably made small enough to be easily transported and manipulated during bail out from the plane.

Some other anticipated variations of the reference point device include an audible alarm which sounds at the proper time or a flashing light, and which may also be used to warn the skydiver of eminent deployment of the parachute or as a continuous audible and/or visual lighted point of reference in conjunction with the reference device such as when used at night time. Additionally, if an altimeter or barometric pressure sensitive switching system is used to automatically deploy the parachute of the reference device, rate of fall of the device can also be taken into account via a battery powered microprocessor so that if the rate of fall is sufficiently slow, the chute will not open regardless of the height above ground, and this because some expert skydivers may wish to retrieve the device in flight, placing it in their jacket or suit prior to deployment of the parachute in order to avoid searching for the device once it has landed. A homing beacon such as an audible tone, radio transmission or the like may also be used for easier retrieval of the device. Another feasible parachute deployment system that I have thought of using is a remote control system similar to an electric remote garage door opener wherein a battery powered radio transmitter with activation button is attached to or carried by the skydiver, and the reference device includes a battery powered radio receiver connected to electric components or electronics which in turn are connected to suitable electro-mechanical devices to release the parachute at the time the skydiver pushes the activation button to transmit the signal to the radio receiver to deploy the parachute. I have also considered use of a small explosive charge to be set off at the proper moment to deploy the parachute, much like the small toy rockets which children have enjoyed for many years in the U.S.

Other objects, advantages and possibilities of the present invention will become apparent by reading the remaining specification with a review of the included drawings.

BEST MODES FOR CARRYING OUT THE INVENTION

Figure 1:
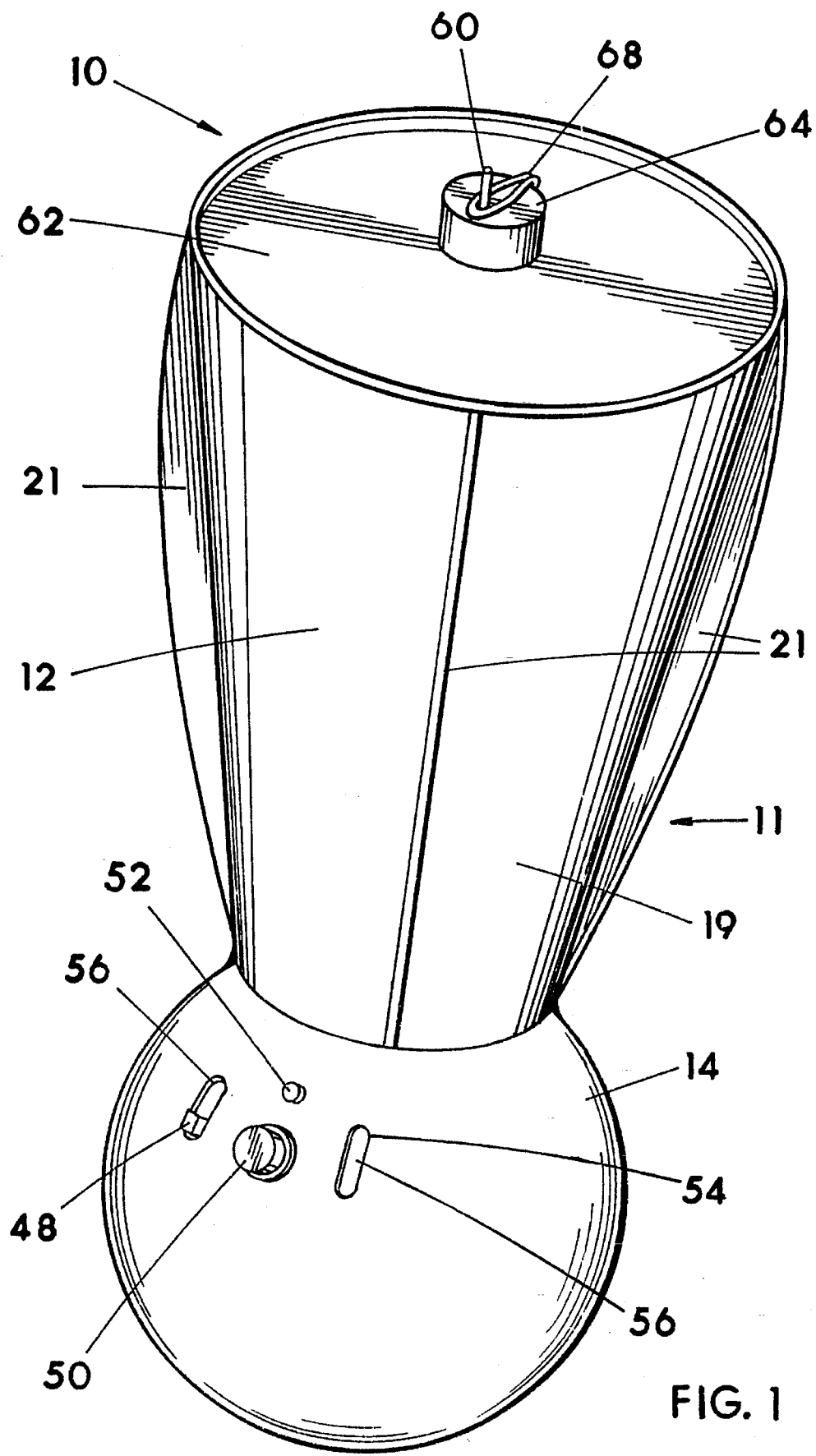
FIG. 1 is a top perspective view of a structural embodiment of the free fall reference point device or apparatus given for example. The remaining drawing figures are of this embodiment or portions thereof.

Referring now to the drawings where the free fall reference point device of FIG. 1, herein after referred to as reference device or device 10, is illustrated for example. A method of a skydiver 20 practicing lateral movement and speed of fall manipulation during free falling using reference point device 10 includes the skydiver jumping from a high altitude aircraft to enter a free fall; and the skydiver releasing the reference point device 10 to free fall independently of the skydiver 20 at approximately the same time as jumping from the aircraft, and with the reference point device 10 structured to achieve and maintain a terminal velocity substantially equal to a terminal velocity of the skydiver. With the skydiver generally maintaining sight of the reference point device 10 and using the device 10 as a relative stable point of reference by way of mentally noting his position relative to the position of device 10, the skydiver manipulates his body and extremities (arms and legs) to alter his position as desired relative to reference point device 10. The skydiver gauges his success of the alteration of his position by way of visually ascertaining his new position relative to reference point device 10 after or even during the manipulation his body and extremities.

A method of a skydiver practicing controlled stability during free falling using reference point device 10 includes the skydiver 20 jumping from a high altitude aircraft to enter a free fall, and with the skydiver releasing reference point device 10 to free fall independently of the skydiver at approximately the same time as jumping from the aircraft, and with reference point device 10 structured to achieve and maintain a terminal velocity substantially equal to a terminal velocity of the skydiver. With the skydiver generally maintaining sight of reference device 10 and using the free fall reference point device as a relative stable point of reference, the skydiver manipulates his body and extremities, which in this case may require the skydiver to hold his body and extremities still, in practicing controlled stability relative to the free fall reference point device. The skydiver gauges his success of controlled stability by way of visually ascertaining his position, whether constant or not, relative to reference point device 10.

Reference device 10 includes a body which in the example being described a housing 11 comprising an upper cone-shaped portion 12 and a lower spherical portion 14. Housing portions 12 and 14 are connected to one another, and the entire housing 11 structure may be openable, such as by a seam, openable and reclosable in the middle thereof to allow servicing of components therein, or for ease of initial manufacturing. Housing 11 may economically be made of plastics for weight and durability reasons, although other suitable materials such as metals and composites may also be used. Device 10 is structured to be easily hand-held or hand carried, and is approximately 8.5 inches in height and about 3.5 inches in diameter at the top of the cone portion 12 and center of the lower spherical housing portion 14. The weight of device 10 in this size is a little over 1.5 pounds, or about 736 grams. It should be noted these sizes and weights can be varied greatly within the scope of the invention. The spherical housing portion 14 contains a semi-spherical weight 16, made of lead, steel or some other suitable material, positioned within the bottom half of housing portion 14 and connected thereto by an elongated machine screw 18 passing through an aperture in the bottom of housing portion 14. Weight 16 should be centrally placed in the bottom most section of housing portion 14 for balance, as are all elements contained in housing 11 for balance and proper weight distribution to avoid wobbling of device 10 when falling.

Device 10 is weighted and aerodynamically structured to fall at the terminal velocity of skydiver 20, which is around 109 to 120 mph in range. The mass, size and shape of skydiver 20 and even the type of clothing he is wearing effects the velocity at which that particular skydiver 20 falls. Therefore device 10 can be structured, by using various weights 16 and aerodynamic shapes of housing 11, to fall at a velocity below or above the 109 to 120 mph average. Different weights of the weight 16 and materials of differing mass from the factory may be used by different skydivers, or alternatively weights in small increments could be added or subtracted as needed by skydivers who wish to perfectly adjust the terminal velocity of device 10 to their rate of free fall. Alternatively to adjusting the weight of device 10 to manipulate its free fall speed, or possibly in conjunction with weight alteration, the aerodynamic shape of housing 11 can be altered in manufacturing, or may be field alterable by the skydiver, such as with flanges or tabs and the like (not shown) which may be bent or repositioned to create increased or decreased air contact and thus resistance which will effect the terminal velocity. Device 10 may be manufactured in many different terminal velocity models, tested to verify the actual terminal velocity in falling, labeled as such, and shipped to the consumers, wherein a skydiver could simply buy the device 10 which achieved the terminal velocity most suited for him or her, such as 109 mph, wherein another skydiver may wish to buy a 118 mph model. Therefore, if skydiver 20 falls at a terminal velocity of 108 for example, weight 16 or the mass thereof may be slightly reduced. These weight or mass adjustments would normally be minor and may constitute, for example, the addition or elimination of a nut or washer of a dense high mass material onto or from bolt 18 which is centrally positioned so as to maintain symmetry of device 10.

Preferably, reference device 10 also not only achieves and maintains the approximate terminal velocity of a skydiver, but it preferably achieves the terminal velocity in about the same time, about 11 seconds or so, and this so that during free fall it potentially remains in continuous close proximity to the free falling human so he may be sufficiently close to reference device 10 to gauge his movements relative to the reference device.

To avoid spinning of device 10 which can decrease velocity and direction during free fall, narrow longitudinal fins 21 are preferably incorporated into the exterior side wall 19 of housing portion 12.

Figure 2:
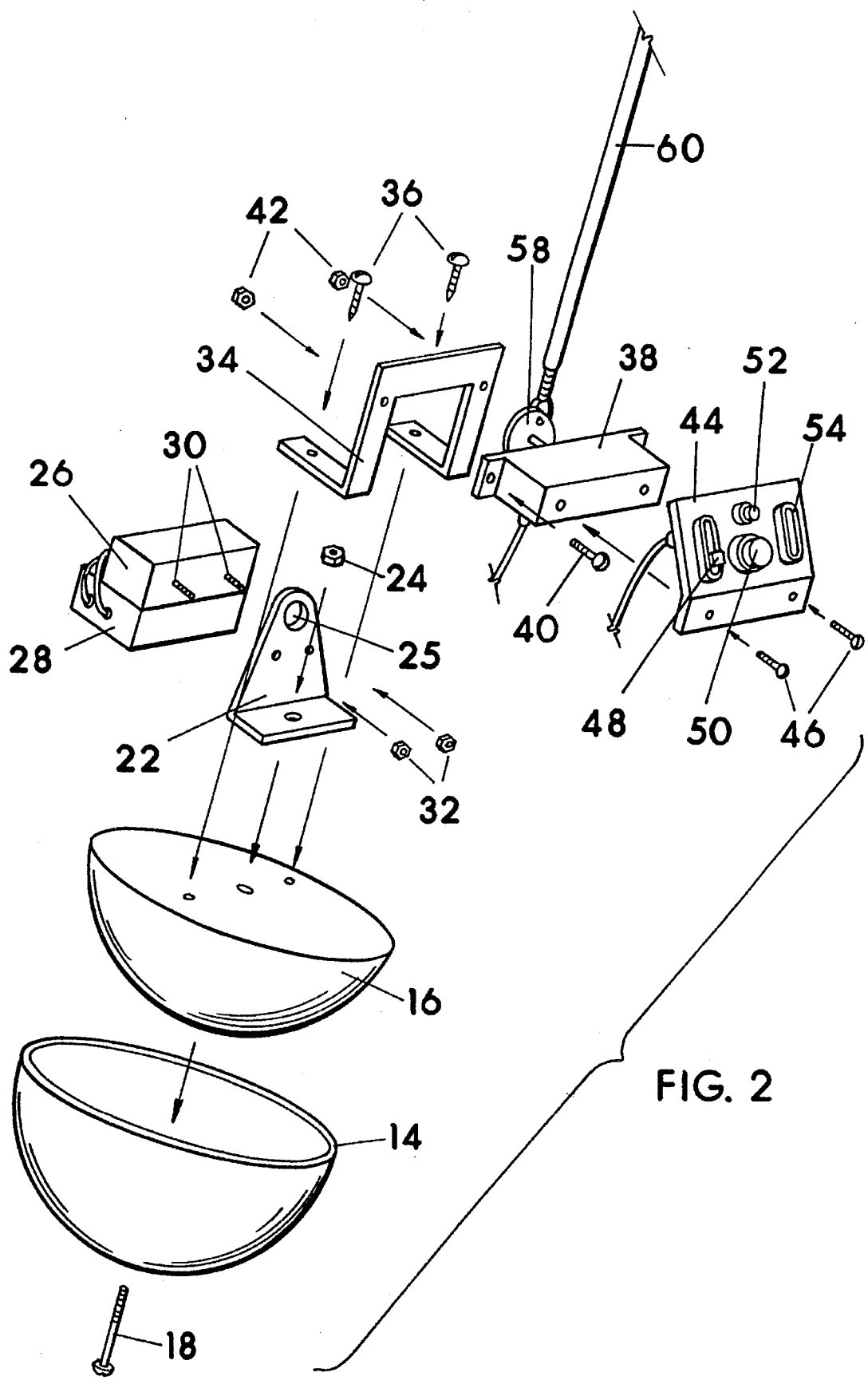
FIG. 2 is an exploded perspective view of component parts of the bottom portion of the housing.
Figure 3:
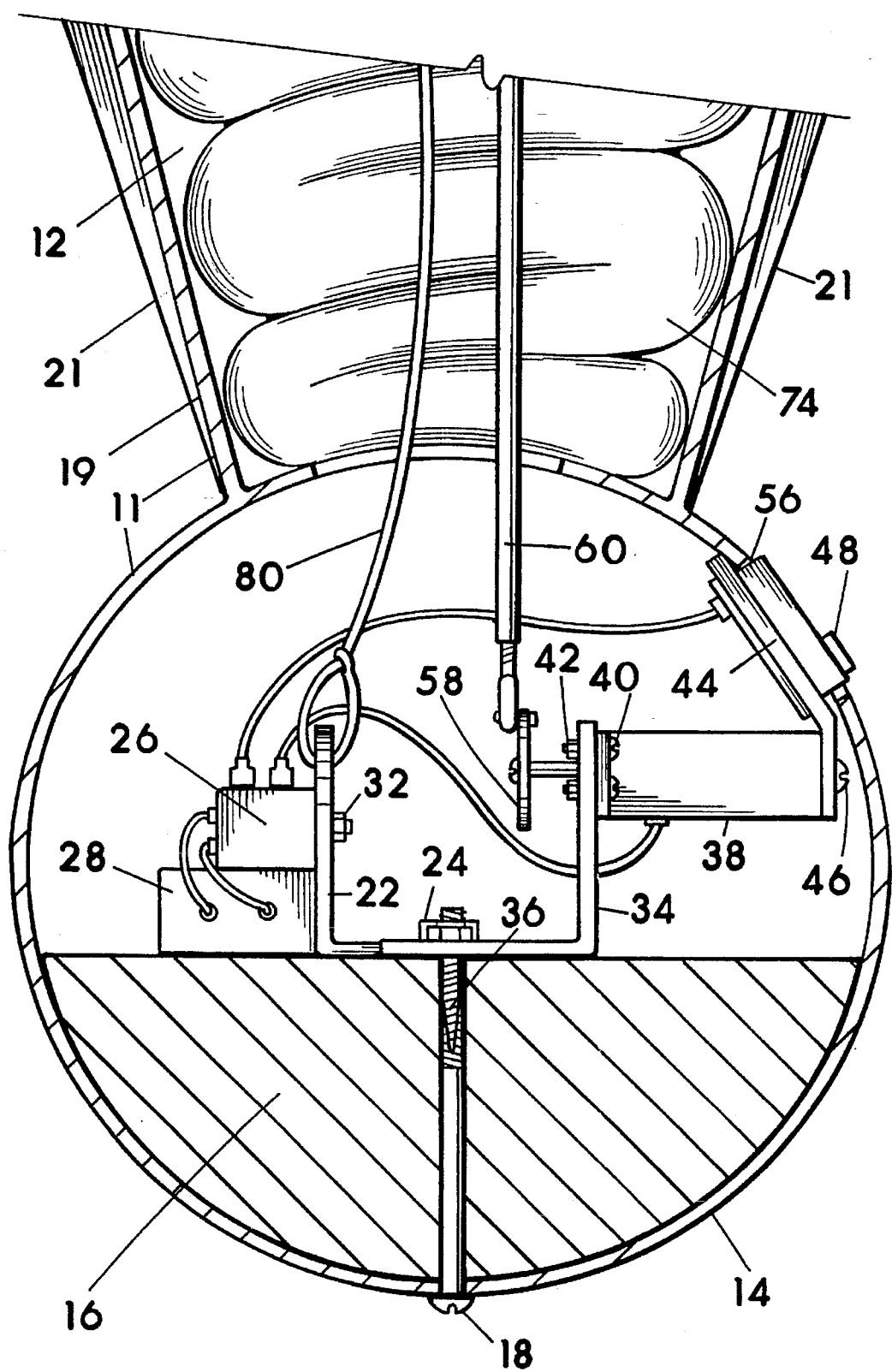
FIG. 3 is a cross sectional side view of the bottom portion of the housing showing positions of housed components.
Figure 4:
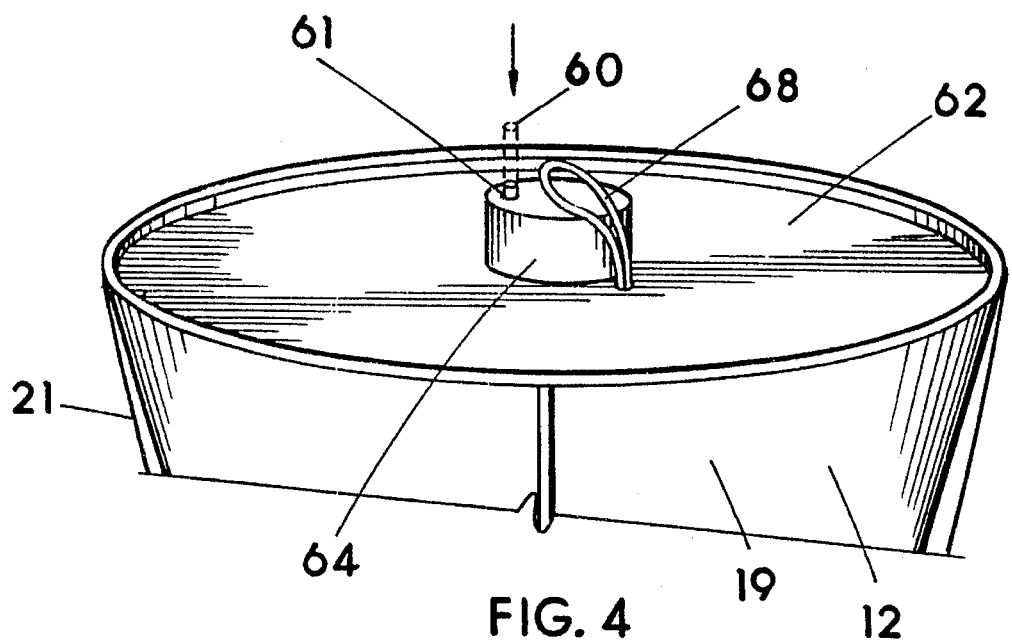
FIG. 4 is a perspective top view of the top portion of the housing showing the release rod partially retracted into the ribbon housing cup and the closing band in the process of being detached from the release rod.
Figure 5:
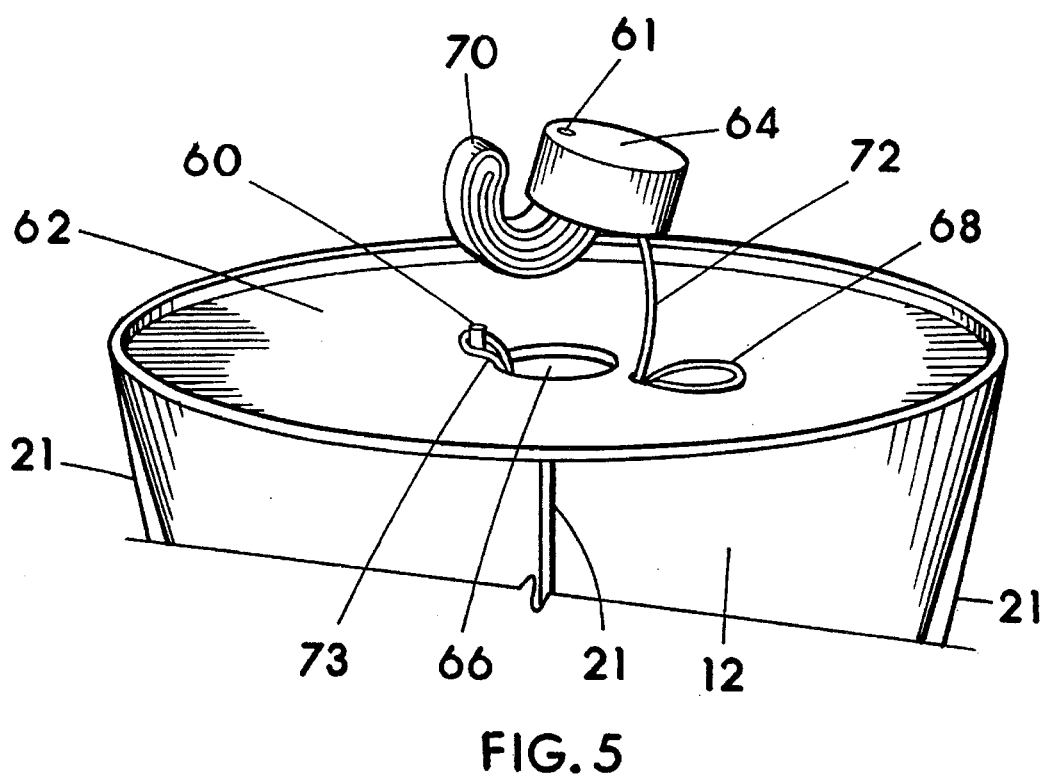
FIG. 5 illustrates the ribbon housing cup released from the upper housing portion with the ribbons beginning to be deployed from the ribbon housing cup.
Figure 6:
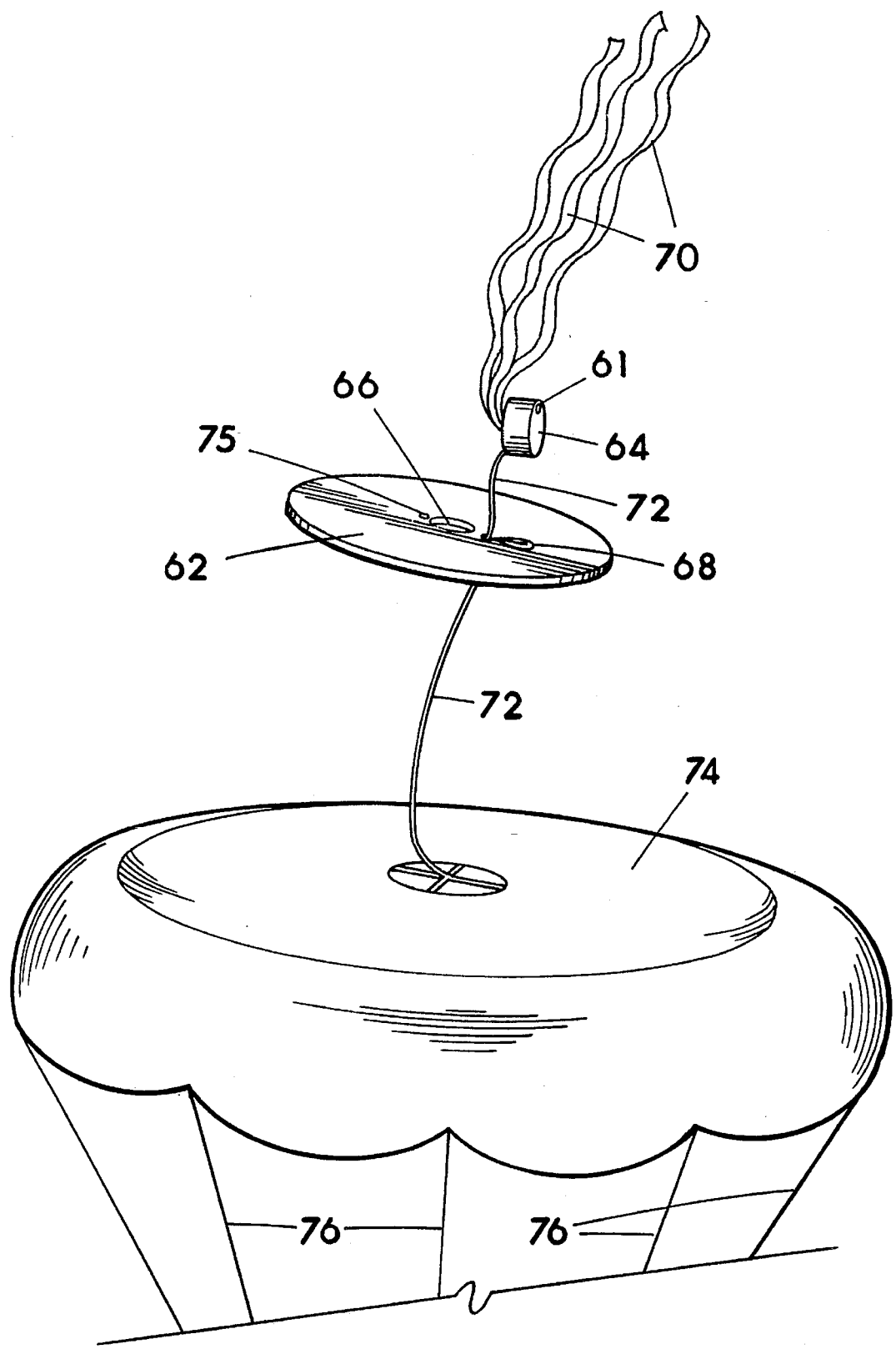
FIG. 6 illustrates the ribbons fully deployed and a parachute activation cap released and drawn upward in part by the ribbons above the deployed parachute.
Figure 7:
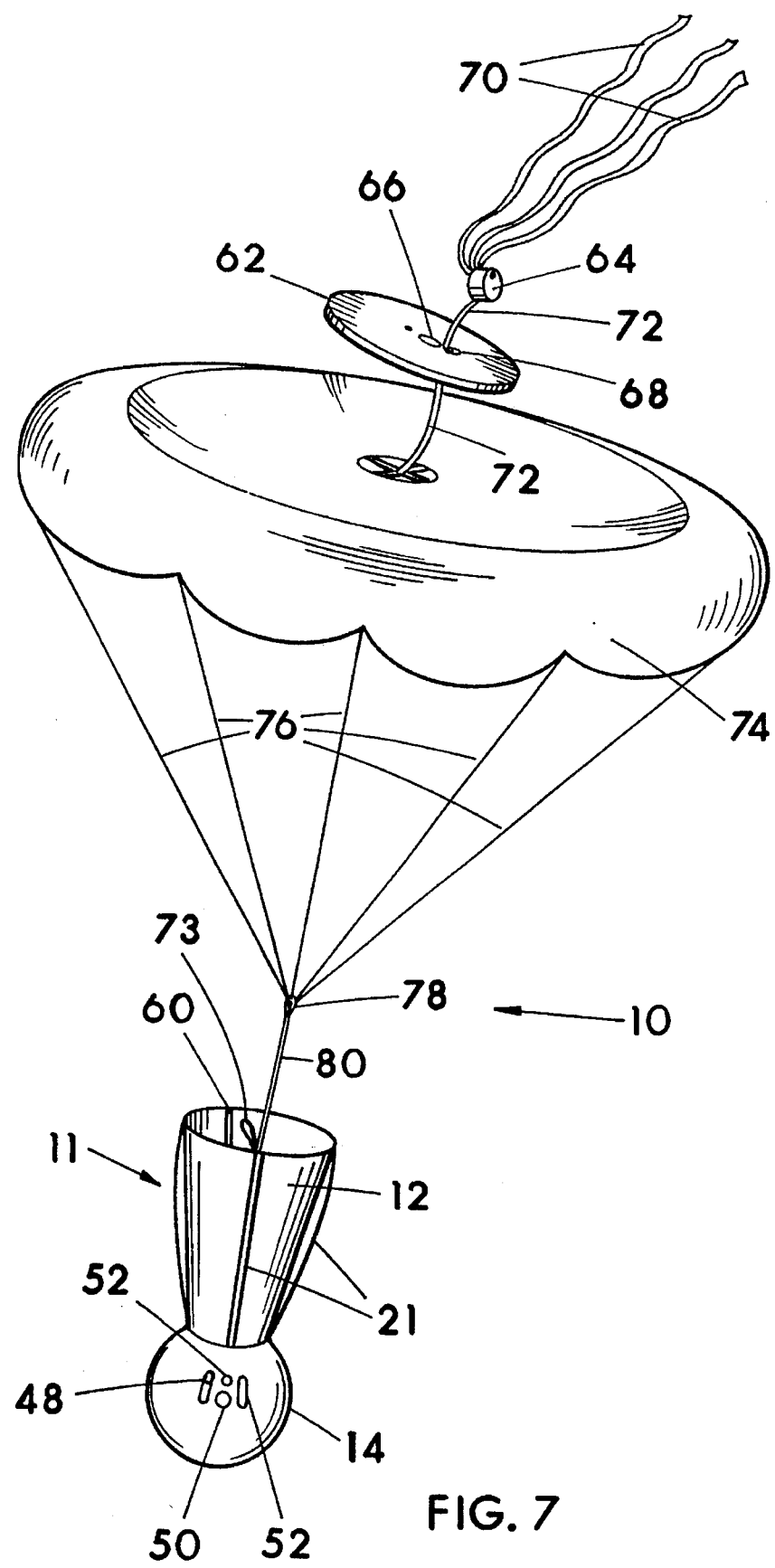
FIG. 7 depicts the free fall reference device with the parachute fully deployed.
Figure 8:
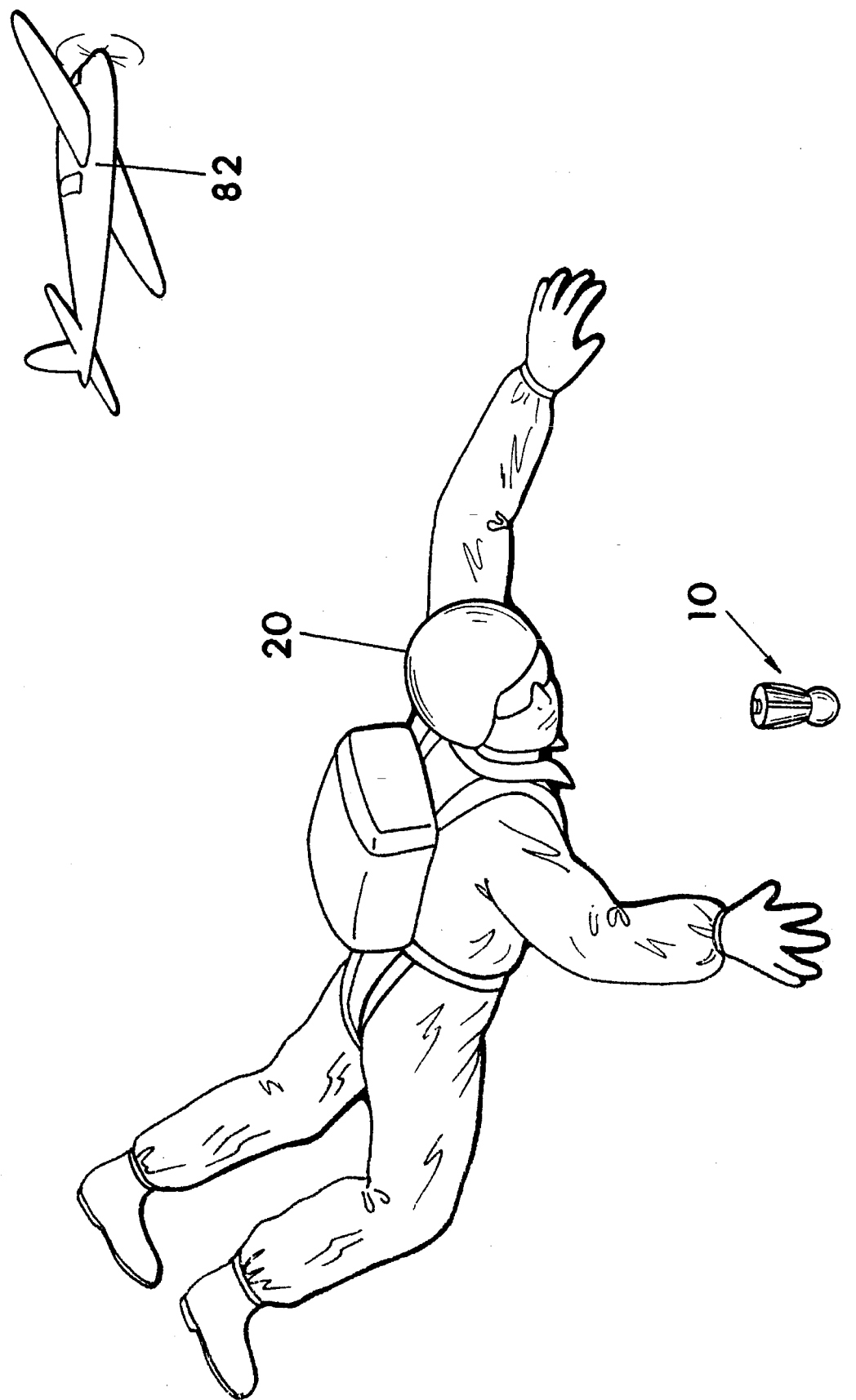
FIG. 8 illustrates the free fall reference device in use indicating relative speed of fall and lateral position to a skydiver who has just jumped from an airplane. The skydiver is shown with a stored parachute on his back.

Now with reference to FIGS. 2 through 7 for descriptions of feasible parachute 74 deployment controls and mechanics, shown in FIGS. 2 and 3 is a bridle attachment bracket 22 which is a small L-shaped bracket having a vertical plate, containing aperture 25, and a narrow horizontal connecting plate affixed to the top flat surface of weight 16 by machine screw 18 and nut 24. Bridle attachment bracket 22 is structured to support electronic housing 26 and a battery 28 with bolts 30, affixed to electronic housing 26, and nuts 32. Positioned adjacent to bridle attachment bracket 22 is U-shaped motor mount 34 which is affixed to weight 16 with two sheet metal screws 36. Motor mount 34 supports motor 38 shown in a rectangular housing, by bolts 40 and nuts 42, which is powered by battery 28 and operated by controls housed within electronic housing 26. Motor 38 also supports control panel 44 by bolts 46, which includes a flat plate affixed with an on/off switch 48, activation button 50, activation LED indicator 52, and display 54. Control panel 44 is structured to be positioned adjacent the interior wall side of housing portion 14 and aligned with respective slots 56 which are openings in the side wall of housing portion 14, allowing access to activation button 50 and on/off switch 48 from the exterior of housing portion 14 as shown in FIG. 1. Motor 38 activates rotation of an annular plate 58 connected to the shaft of motor 38 to which vertically positioned release rod 60 is endwardly pivotally and eccentrically affixed. 180 degree rotation of plate 58 with rod 60 in the raised position as shown in FIG. 3 by motor 38 lowers the distal end of release rod 60. Rod 60 may be manually pulled upward, rotating plate 58 and the shaft of motor 38 to set the device in a ready-for-use state as will be understood with continued reading. Release rod 60 is an elongated plastic or metal member which extends upward through housing portion 12 and through a flat annular activation cap 62 structured to enclose the open top end of housing portion 12. Release rod 60 extends through aperture 75 within activation cap 62 with aperture 75 positioned adjacent a central opening 66 in cap 62. The upper distal end of release rod 60 extends further upward through a opening 61 in cylindrical ribbon housing 64. Ribbon housing 64 is a small cylindrical cap having a closed top end and an open bottom end, and is positioned over central opening 66, which is somewhat smaller than the diameter of ribbon housing 64. Therefore, release rod 60 is positioned slightly off center within housing portion 12 and extends first through aperture 75 located adjacent central opening 66 in activation cap 62, with elastic closing loop 73 connected thereto. Closing loop 73 extends up, via stretching, through central opening 66 and loops over release rod 60 to retain cap 62 in place. Release rod 60 continues to extend upward and exits through opening 61 in ribbon housing 64. Ribbon housing 64 is secured in position over central opening 66 with an elastic closing band 68 which extends from the surface of activation cap 62 where it is attached, up the side and over the top of ribbon housing 64, and is looped over the distal end of release rod 60 which extends a short distance beyond the top surface of ribbon housing 64. Ribbon housing 64 contains a series of folded ribbons 70 which include narrow sections of fabric or plastic material about two feet in length. Ribbons 70 primarily serve as a visual warning signal to skydiver 20 to avoid collision with device 10 as it is about to decelerate dramatically when parachute 74 is deployed, therefore bright colors such as red are suggested. A connecting cord 72 connects ribbon housing 64, to parachute activation cap 62, and extends downward and also connects parachute activation cap 62 to the top central surface of parachute 74. Parachute 74, when not deployed, is folded and stored within the cone-shaped housing portion 12. Parachute 74 is connected by several lines 76 which converge and connect onto bridle attach loop 78, which is merely a loop of cord which is reinforced. Bridle attach loop 78 is connected to a section of cording referred to as parachute bridle 80 which extends from bridle attachment bracket 22, located within housing portion 14, up through an opening in the top of housing portion 14 to the open top end of housing portion 12. Affixed to parachute bridle 80 is closing loop 73 which is an elastic loop such as a rubber band affixed to bridle 80 near the top or downward inside of housing portion 12 as shown in FIG. 7. Closing loop 73, as previously described, extends up through central opening 66 of activation cap 62 and is looped over the upper end of release rod 60. Closing loop 73 serves to secure activation cap 62 onto to the upper open end of housing portion 12 until such time as rod 60 is drawn downward to release closing loop 73.

Deployment of parachute 74 begins with the automatic triggering of a preset timer or a barometric pressure sensor switching control housed in housing 26. Motor 38 is then activated via battery 28 power and rotates annular plate 58 to which release rod 60 is endwardly and eccentrically affixed. The rotation of plate 58 lowers release rod 60 sufficiently to just pull the distal end thereof through opening 61, thereby releasing closing band 68. The release of closing band 68 releases ribbon housing 64 which is pulled upward by the wind draft, although still connected to cap 62 by cord 72, where ribbons 70 are released and unfolded. After a predetermined amount of time later, such as five or ten seconds, or with release rod 60 continuously and slowing being withdrawn, release rod 60 is retracted further into housing portion 12, which retracts the distal end of release rod 60 below the top surface of activation cap 62. This causes closing loop 73, previously looped over release rod 60, to release activation cap 62. The wind current pulls activation cap 62 upward, pulling parachute 74, connected by cord 72, out of housing portion 12. Parachute 74 gently lowers device 10 to the ground where it can be retrieved for reuse later on.

As previously mentioned, reference device 10 may be structured in numerous manners, and reference device 10 may employ numerous electrical controls and control circuits housed in housing 26 and powered, when electrical power is needed, by battery 28. The electronics or electrical circuitry may be such that a low battery power circuit is employed and activated via on/off switch 48 to verify sufficient battery power to deploy the parachute. When switch 48 is turned on and sufficient battery power is available LED 52 will light. On/off switch 48 also activates the barometric pressure sensors or electric timers (counters) housed in housing 26. Electronic housing 26 may contain a commercially available microprocessor which is used in existing automatic parachute deployment devices for automatically deploying parachute 74 at a predetermined altitude AGL. The microprocessor works in conjunction with a barometric pressure sensor powered by battery 28, and serves to control electrical power flow to operate motor 38.

In utilizing device 10, whether a simple timer alone or barometric pressure sensor in conjunction with a microprocessor is utilized to control the release of the parachute 74, the controls most likely will need to be set by the skydiver prior to jumping. First, on/off switch 48 is turned on which activates LED 52 if battery 28 is fully charged. If LED 52 does not light, then battery 28 is not sufficiently charged to successfully deploy parachute 74 and battery 28 must be changed. If a simple timer is used, the skydiver presses button 50 to set the time delay in the clock, the delay time will be shown in display 54 which could be an LCD, and each push of button 50 may register a one second delay. Upon the proper delay time being displayed, the button 50 may be held in for a period of 5 seconds and then released to request the timer hold its state until the jump has began at which point the button 50 is pushed again to start the timer counting down and then to switch electrical power to motor 38 to release the ribbons and parachute. Stepping motors, servos or motors with gear reduction systems may be employed as or with motor 38. If more complex electronics are deployed, such as barometric pressure sensitive electronics, these will normally need to be initialize or set by the skydiver so that the ribbons and parachute will be deployed at the proper above ground level (AGL), since when jumping one cannot simply activate a parachute based on height above sea level or barometric pressure relative thereto, and one may desire to land on top of a 2 or 5 thousand foot above sea level ground surface, therefore automatic chute deployment systems normally must be trained to the starting elevation and the desired chute activation height above that position, or sometimes below that position such as if the skydiver moves from a high altitude mountain air strip and skydives into a much lower elevation in a valley for example. When such electronics are utilized in device 10, i.e. barometric pressure sensitive controls which sense barometric pressure changes to determine AGL deployment of a parachute, which may be purchased from numerous manufactures of electronic controls for automatic parachute openers, the skydiver uses button 50 to program into the solid-state memory of such controls the starting barometric pressure and the desired barometric pressure at which the parachute is to be deployed, and the readings and setting are displayed on display 54. Device 10 should be set to deploy parachute 74 at a certain elevation AGL, and it must first be ascertained if the landing sight is a different elevation from that of the point of origin or airport as is well known in the field of automatic parachute deployment device, controls and electronics.

If the landing site is the same elevation as the point of origin from which the plane takes off, then on/off switch 48 is turned on and activation button 50 depressed and immediately released. Display 54 will show "0" with the microprocessor preprogrammed to activate parachute 74 at 2,500 feet above the elevation of the airport, with 2,500 feet being the predetermined optimum altitude for deployment of parachute 74 of device 10. If the landing site is to be at a higher elevation than the point of origin, manual depression of activation button 50 is depressed and maintained until display 54 reads the altitude of the landing sight, which for example may be 2000 feet above the current ground level, or 2000 feet above the point of origin of the airplane. Display 54 shows an incremental increase in number and when the desired number or altitude of the land site, say 2,000 feet is reached, activation button 50 is then released which stops display at 2000. The barometric pressure sensor located in electronic housing 26 is now set to be activated and deploy parachute 74 at 2,500 feet above the 2,000 foot level of the landing site, which is 4,500 feet above the point of origin. If a landing site lower than the point of origin is used, activation button 50 is depressed until display 54 reaches the maximum readout and begins to count backwards to display the proper negative readout. As with the simple timer controls briefly described above, when jumping from the airplane 82, the skydiver pushes button 50 once to start the electronics reading the preset information in preparation of automatic parachute deployment.

Once device 10 is programed for deployment of parachute 74 at the correct elevation, skydiver 20 is ready for diving when the plane reaches the desired elevation, which may be anywhere from 8,000 to 13,000 feet above ground level (AGL). Skydiver 20 may jump holding device 10 in his hand and then release it, or throw device 10 from the plane and then dive out. The later method, however, runs the risk of device 10 becoming lost unless skydiver 20 jumps immediately after release of device 10. Once device 10 is released, skydiver 20 should be positioned sufficiently close to easily see device 10 and be able to perform changes in maneuvers, such as drifting away from and towards device 10. It may be more comfortable for skydiver 20 to position himself several feet away from and somewhat above device 10 so visual observation is easier. Novice skydivers 20 can simply practice maintaining a stable fall, using device 10 as a reference point to determine lateral deviations from his course. Experienced skydivers 20 can use device 10 for games, such as throwing device 10 back and forth among several skydivers like a ball. When the preset altitude or barometric pressure or set time is reached, parachute 74 will automatically be deployed. If skydiver 20 is positioned directly over device 10, the deployment of ribbons 70 will warn skydiver 20 to back away from device 10 prior to deployment of parachute 74, to avoid collision. If skydiver 20 desires not to retrieve device 10 from the ground, he may retrieve device 10 during free fall and place it in his jump suit. Even through device 10 will still be programed for deployment of parachute 74 at the predetermined barometric pressure or time after start, parachute 74 will not expand in the suit since wind current is necessary to eject and expand parachute 74. Additionally, rate-of-fall circuitry may be employed which would prevent activation of motor 38 if device 10 were place in the suit of a skydiver who himself had deployed his chute and thus was descending at a slow rate.

I anticipate a radar system for determining the proper AGL for automatic parachute deployment could be installed in the reference device which would detect the reference device height above ground level using radar directed at the ground, and this system could be battery powered, use a microprocessor, and would require the skydiver to do nothing more than make sure the system was on (activated) prior to releasing the reference point device for free fall.

As previously mentioned, although prohibited in many areas by laws for safety and littering reasons, the present reference device may be structured without any slowing means or controls such as a parachute and parachute release system. In this situation, the reference device would most likely be a one time use item since it would probably be damaged upon impact with the ground, but this one time use version could be manufactured inexpensively such as from a properly shaped and weighted piece of rigid plastic foam for example.

Although I have very specifically described the present invention, it should be understood that changes in the specifics described and shown may clearly be made without departing from the true scope of the invention in accordance with the spirit of the claims.

What I claim as my invention:

1. A method of a skydiver practicing lateral movement and speed of fall manipulation during free falling, said method comprising the steps of:

(a) a skydiver jumping from a high altitude aircraft to enter a free fall; and the skydiver releasing a free fall reference point device to free fall independently of the skydiver at approximately the same time as jumping from the aircraft, and with the free fall reference point device structured to achieve and maintain a terminal velocity substantially equal to a terminal velocity of the skydiver;

(b) the skydiver generally maintaining sight of the free fall reference point device and using the free fall reference point device as a relative stable point of reference;

(c) the skydiver manipulating his body and extremities to alter his position as desired relative to the free fall reference point device;

(d) the skydiver gauging his success of the alteration of his position by way of visually ascertaining his position relative to the free fall reference point device after manipulating his body and extremities to alter his position.

2. A method of a skydiver practicing controlled stability during free falling, said method comprising the steps of:

(a) a skydiver jumping from a high altitude aircraft to enter a free fall; and the skydiver releasing a free fall reference point device to free fall independently of the skydiver at approximately the same time as jumping from the aircraft, and with the free fall reference point device structured to achieve and maintain a terminal velocity substantially equal to a terminal velocity of the skydiver;

(b) the skydiver generally maintaining sight of the free fall reference point device and using the free fall reference point device as a relative stable point of reference;

(c) the skydiver manipulating his body and extremities in practicing controlled stability relative to the free fall reference point device;

(d) the skydiver gauging his success of controlled stability by way of visually ascertaining his position relative to the free fall reference point device.

3. A reference point device for use during skydiving; said reference point device comprising;

a housing weighted and shaped such that when tossed from a high altitude aircraft said housing falls and achieves a terminal velocity substantially equal to that achieved by a free falling human being while skydiving, and wherein said terminal velocity is achieved by said housing at substantially the same rate as a free falling human being after starting to fall, the weight and shape of said housing being such as to provide for a relative stable vertical fall, whereby said housing during falling remains in close proximity to a free falling human being to serve as a reference point;

stored deployable deceleration means connected to said housing for decelerating said housing after achieving terminal velocity for bringing said housing to a soft landing; and, means for deploying said deployable deceleration means prior to said housing landing and after said housing has achieved terminal velocity wherein said deployable deceleration means connected to said housing is a parachute stored in said housing and wherein said means for deploying said parachute includes an electric motor, a battery connected to said motor for powering said motor, a rod connected at a first end thereof eccentrically to a plate connected to a shaft of said motor, a second end of said rod connected to means retaining said parachute within said housing, and means for actuating said motor; whereby upon actuation of said motor, said rod is moved away from said means retaining said parachute and said parachute is deployed.

* * * * *